United States Patent [19]
Wu

[11] Patent Number: 5,878,878
[45] Date of Patent: Mar. 9, 1999

[54] CASE STRUCTURE WITH TWO OPENABLE SIDES

[76] Inventor: Hsien-Chang Wu, No. 17, Kuang-Wu St., Shu-Lin Town, Taipei Hsien, Taiwan

[21] Appl. No.: 852,500

[22] Filed: May 7, 1997

[51] Int. Cl.$^6$ .......................... B65D 45/20; B65D 45/22
[52] U.S. Cl. .................. 206/307; 206/308.1; 220/333; 220/343; 220/334; 220/4.22; 220/315
[58] Field of Search ................................ 206/308.1, 307, 206/309, 745, 748, 581; 220/343, 334, 324, 326, 4.22, 4.24, 335, 315, 342, 333

[56] References Cited

U.S. PATENT DOCUMENTS

| | | | |
|---|---|---|---|
| 3,295,714 | 1/1967 | Addario | 220/334 |
| 3,666,134 | 5/1972 | Rauch | 220/335 |
| 3,767,110 | 10/1973 | Congleton | 220/326 |
| 4,684,017 | 8/1987 | Watanabe et al. | 206/581 |
| 4,821,751 | 4/1989 | Chen | 206/308.1 |
| 5,246,107 | 9/1993 | Long et al. | 206/309 |
| 5,727,681 | 3/1998 | Li | 206/308.1 |

*Primary Examiner*—Paul T. Sewell
*Assistant Examiner*—Anthony Stashick
*Attorney, Agent, or Firm*—Bacon & Thomas, PLLC

[57] ABSTRACT

A case structure with two openable sides including an upper casing, a lower casing, a series of hingedly connected holding plates disposed between the upper and lower casings, and a plurality of hinge/latch blocks. The upper casing is provided with hinge/latch blocks at both a front end and a rear end thereof at corresponding positions, such that the case may be openable from the front end or the rear end with the hinge/latch blocks at either end as pivots. Each holding plate is double-sided so that it may contain objects on both of its sides to effective use the space available in the case. The holding plates may hold compact disks, magnetic disks, cosmetics, and the like.

6 Claims, 9 Drawing Sheets

CASE STRUCTURE WITH TWO OPENABLE SIDES

BACKGROUND OF THE INVENTION (a) Field of the Invention

The present invention relates generally to a case structure with two openable sides, and more particularly to a case structure in which the case may be openable from either end so that the space available in the case may be effectively used for keeping compact disks, magnetic disks, photographs, or cosmetics.

(b) Description of the Prior Art

Compact disks are very popular today, but how to keep compact disks properly is a problem since they are vulnerable to damage. A commonest way is to keep each compact disk in a square case, so that the compact disks will not be damaged when they are stacked or piled up. But a pile of compact disks in their respective cases is space-occupying and inconvenient to carry.

It is therefore desirable to have a case structure which may be opened from either end so that the available space in the case may be effectively used. It is desirable that the case structure comprises an upper casing and a lower casing hingedly connected at both ends thereof so that the case is openable from either end, and that a series of hingedly connected holding plates for holding objects on both of their sides are disposed between the upper casing and the lower casing for keeping compact disks or other objects.

SUMMARY OF THE INVENTION

A primary object of the present invention is to provide a case structure with two openable sides, which is simple in construction, allows effective use of available space in the case, and is convenient to carry.

Another object of the present invention is to provide a case structure with two openable sides, in which a series of hingedly connected double-sided holding plates are disposed inside the case for holding objects on both of their sides, so that space available in the case may be effectively used for keeping compact disks, magnetic disks, magnetic disks, cosmetics, etc.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
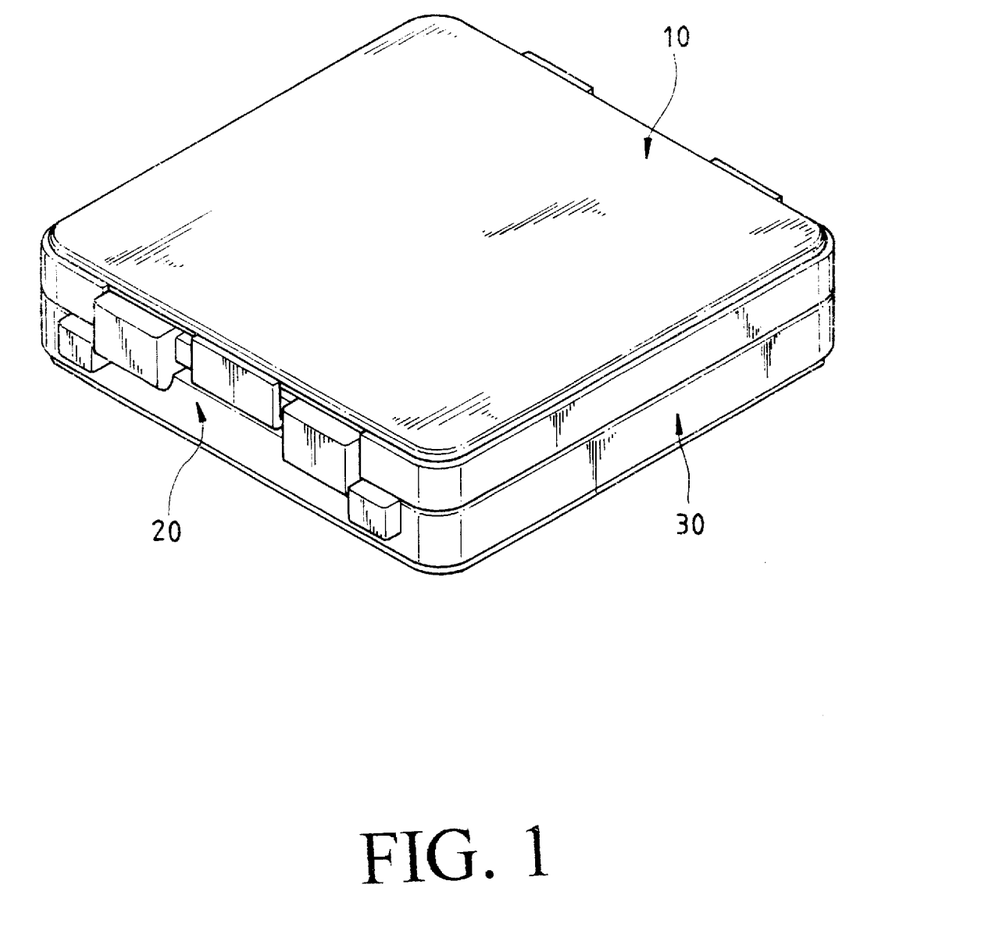
FIG. 1 is a schematic elevational view of a preferred embodiment of the present invention.
Figure 2:
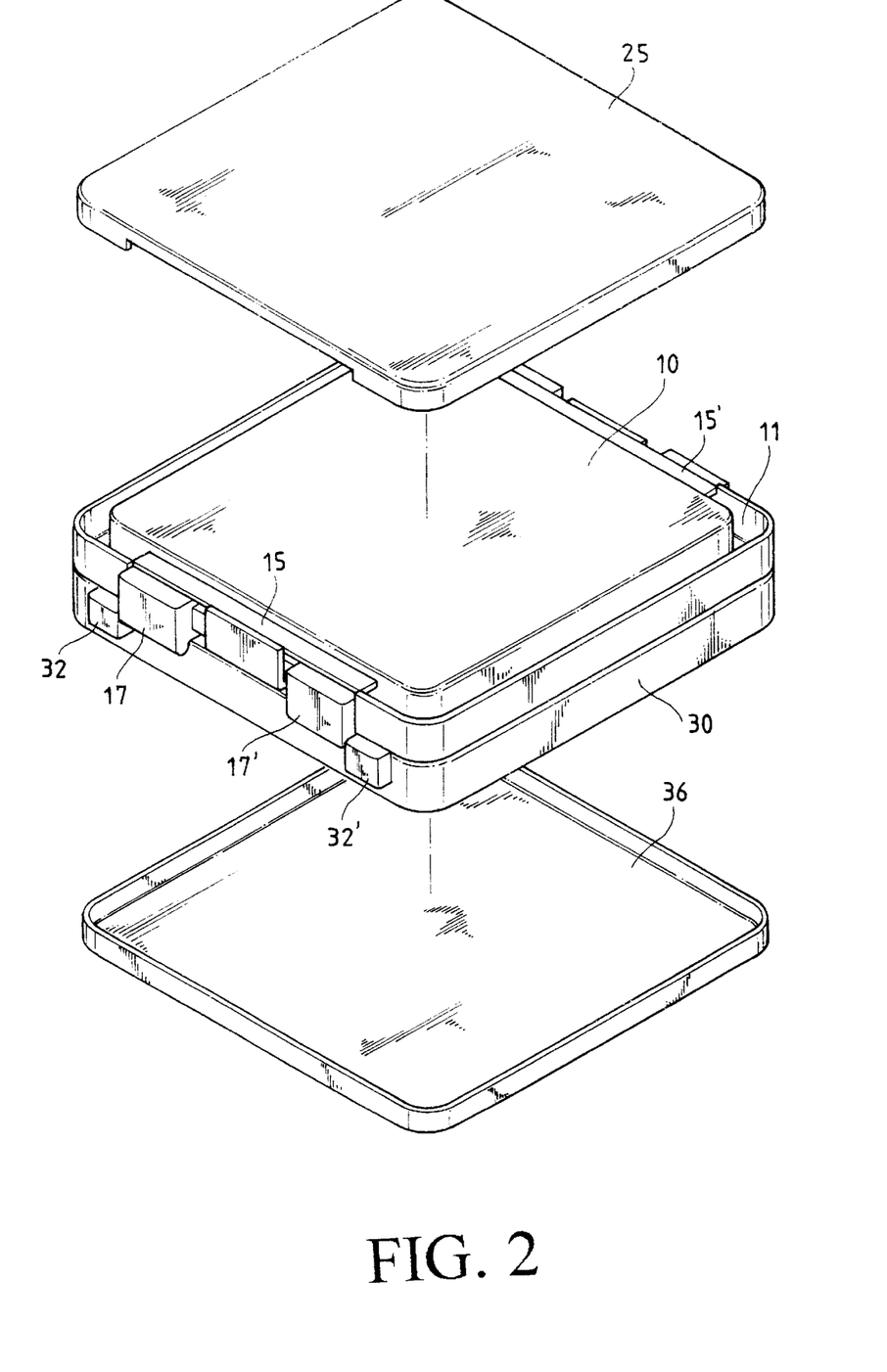
FIG. 2 is a partially exploded view of the present invention.

With reference to FIGS. 1 and 2, the case structure according to the present invention essentially comprises an upper casing 10 and a lower casing 30 hingedly joined by a plurality of hinge pins 20.

Figure 3:
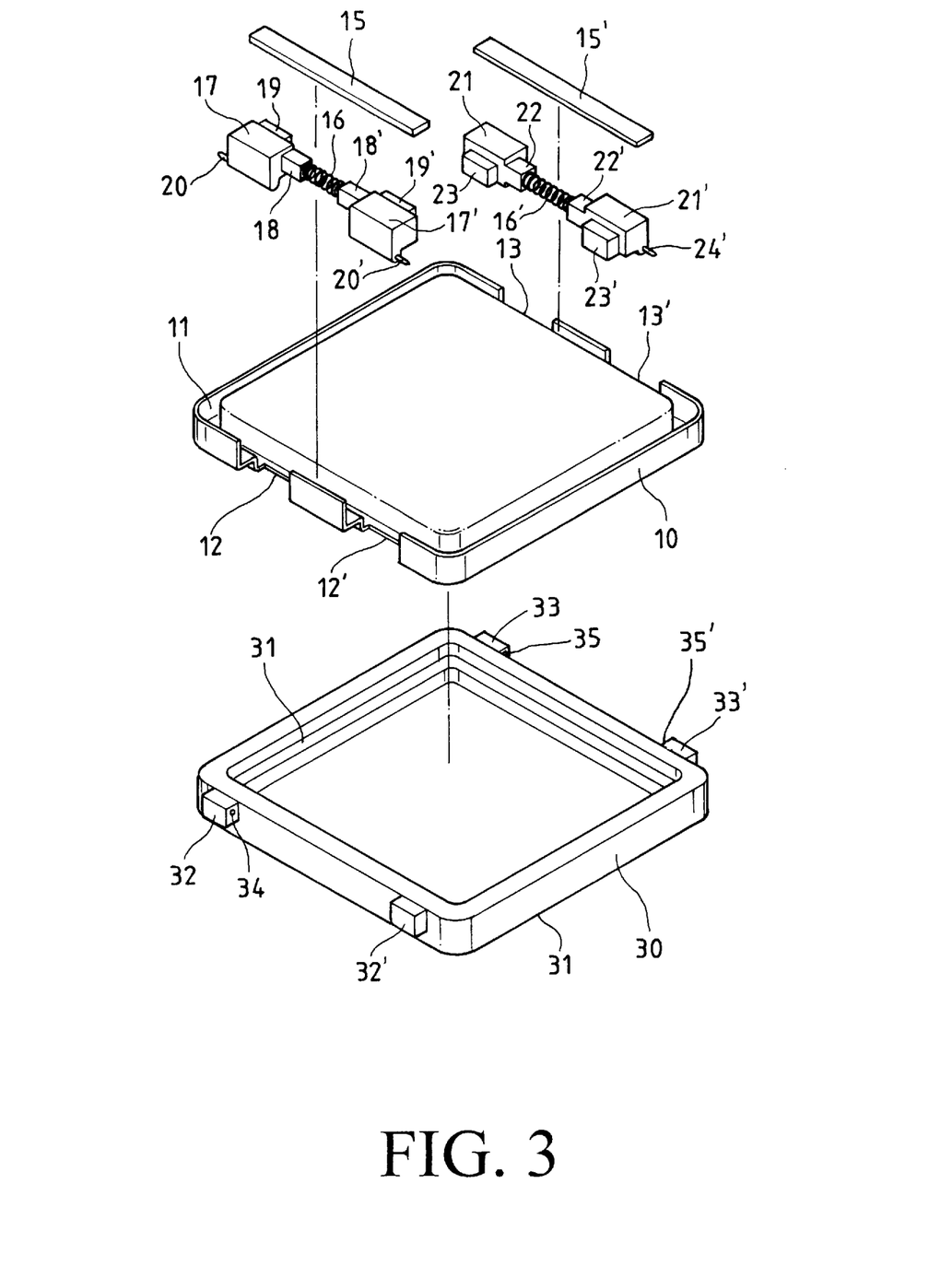
FIG. 3 is a schematic exploded view of the present invention.

In the embodiment shown in FIG. 3, the upper casing 10 has a peripheral stepped groove 11 at a bottom side thereof. Two pairs of locking indentations 12, 12' and 13, 13' are respectively disposed at two opposite ends of the upper casing 10, for receiving hinge/latch blocks 17, 17' and 21, 21' respectively. The hinge/latch blocks 17, 17', 21, and 21' are identical in structure. Essentially, they are rectangular blocks having a lower edge at one side extending downwardly to form an extended portion. Each plate has a hinge pin 20 (20', 24, 24') projecting from a lateral side thereof. The side of the hinge/latch block 17 (17', 21, 21') opposite to the extended portion is provided with a retaining block 19 (19', 23, 23'). The lateral side of the hinge/latch block 17 (17', 21, 21') between the extended portion and the retaining block 19 (19', 23, 23') is provided a projection 18 (18', 22, 22') for receiving one end of a resilient element.

The shape of the lower casing 30 is substantially symmetrical to that of the upper casing 10. The lower casing 30 has a corresponding peripheral stepped groove 31 at a top side thereof, and is provided with two pairs of projecting blocks 32, 32' and 33, 33' for matching i.e. corresponding with, the locking indentations 12, 12' 13, and 13' of the upper casing 10. Each projecting block has a pin hole 34 (34', 35, 35') at an inner lateral side thereof.

Referring to FIGS. 1, 2, and 3, a spring 16 is provided to link the pair of hinge/latch blocks 17 and 17' such that one end of the spring 16 is fitted onto the projection 18, with the other end fitted onto the projection 18'. Likewise, another spring 16' is provided to link another pair of hinge/latch blocks 21 and 21' such that one end of the spring 16' is fitted onto the projection 22, with the other end fitted onto the projection 22'. The pair of hinge/latch blocks 17 and 17' are disposed in the locking indentations 12 and 12', such that the respective retaining blocks 19 and 19' of the hinge/latch blocks 17 and 17' may engage an upper side of the stepped groove 11, with the hinge pins 20, 20' exposed on the outside of the upper casing 10. Additionally, a pair of pressing plates 15 and 15' are disposed on the upper sides of the hinge blocks 17, 17' and 21, 21', respectively. Then, an upper cover 25 of a size slightly smaller than that of the upper casing 10 is disposed and retained in the stepped groove 11 of the upper casing 10, while a lower cover 36 of a size slightly smaller than that of the lower casing 30 is disposed and retained in the stepped groove 31 of the lower casing 30, thus accomplishing assembly of the case structure of the present invention.

Figure 4:
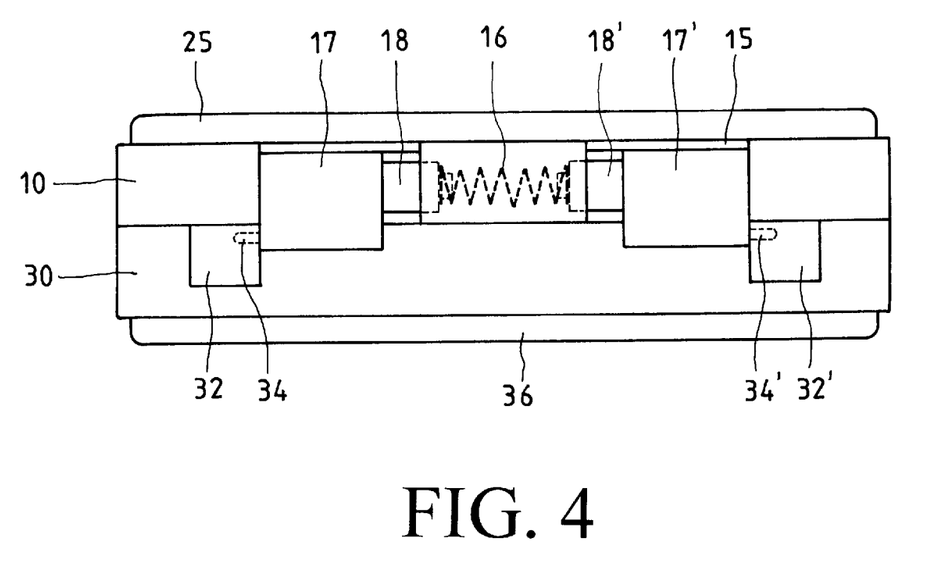
FIG. 4 is a sectional view of the present invention, illustrating engagement of hinge means.
Figure 5:
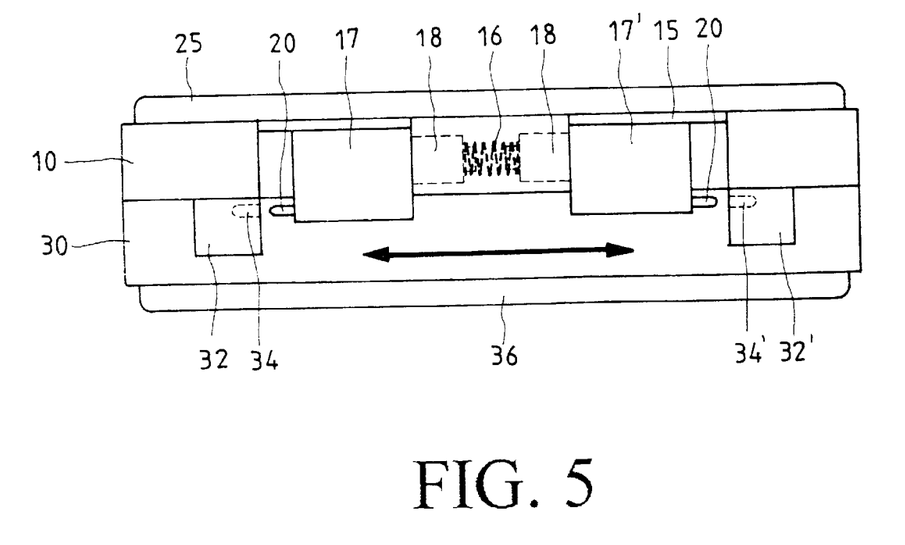
FIG. 5 is a sectional view of the present invention, illustrating disengagement of hinge means.
Figure 6:
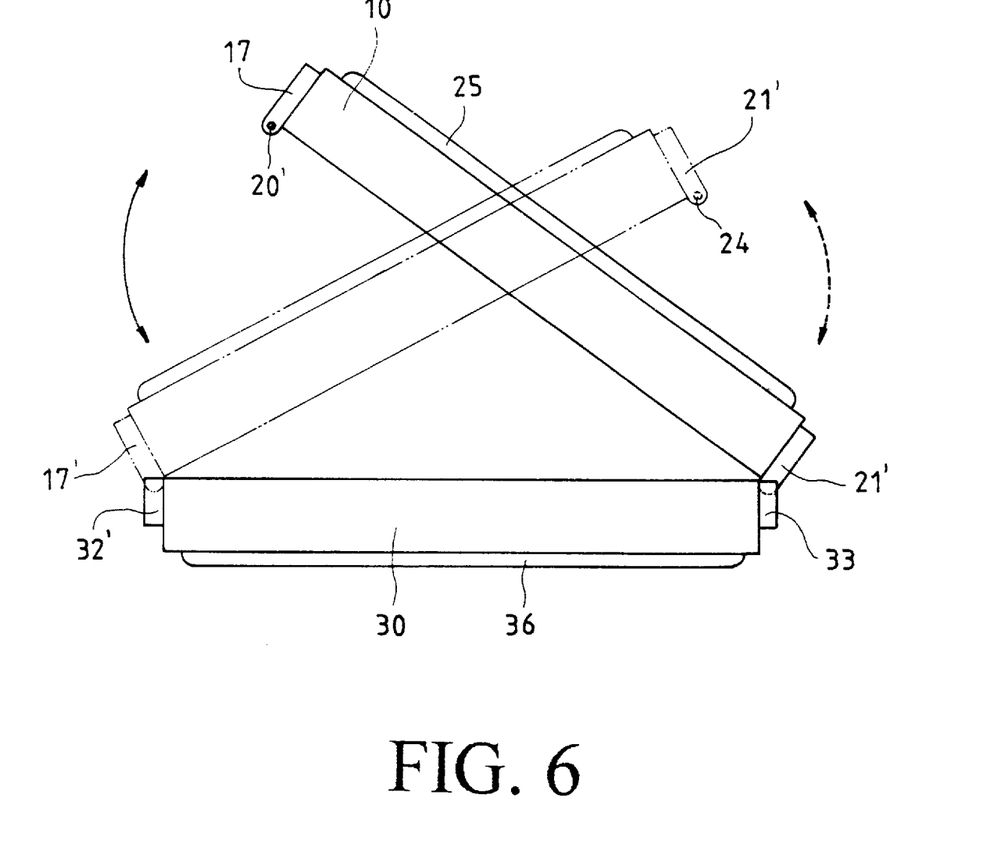
FIG. 6 is a schematic view of the present invention, showing that the case may be opened from either end thereof.

As shown in FIGS. 4 and 5, that side of the upper casing 10 with the hinge blocks 17, 17' is flushed with the lower casing 30 with the projecting blocks 32, 32'. At the same time, the hinge/latch blocks 17, 17' of the upper casing 10 are pressed inwardly so that the upper casing 10 and the lower casing 30 are tightly coupled. Then the hinge/latch blocks 17, 17' are released so that the hinge pins 20, 20' provided thereon pass into the corresponding pin holes 34, 34' in the respective projecting blocks 32, 32' of the lower casing 30. Likewise, the hinge pins 24, 24' on the pivot blocks 21, 21' at the other side of the upper casing 10 are passed into the corresponding pin holes 35, 35' in the respective projecting blocks 33, 33' of the lower casing 30. By means of this arrangement, either of the two pairs of hinge pins 20, 20' and 24, 24' may serve as the hinge whereby the upper casing 10 may be opened from the left side or the right side (as shown in FIG. 6), which is very convenient to the user.

Since the case structure of the present invention may be opened from either the left or the right side, both the top side and the bottom side of each holding plate accommodated in the case may be used for holding objects.

Figure 7:
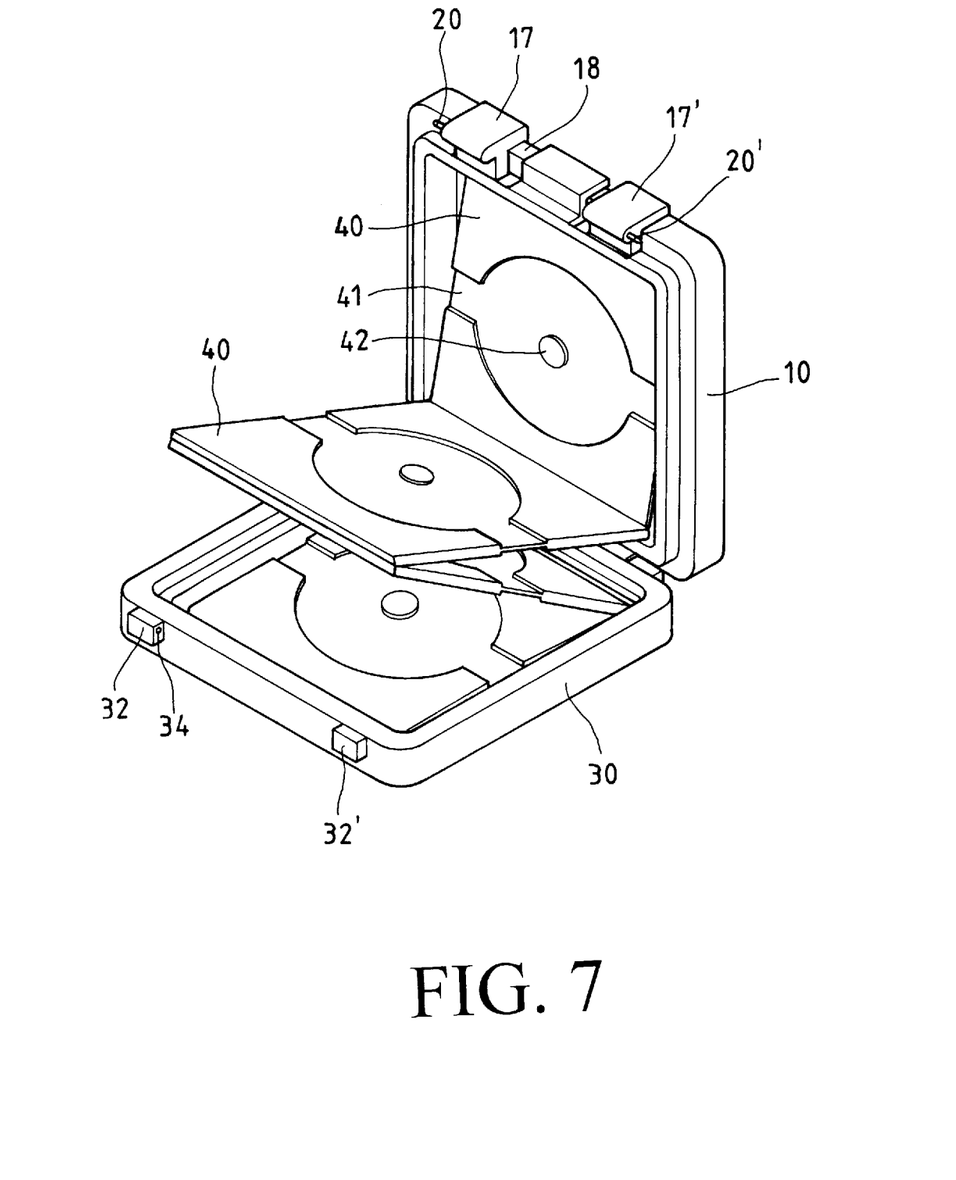
FIG. 7 is an elevational view of the present invention in which the case is provided with a connected series of double-sided holding plates for holding compact disks.
Figure 8:
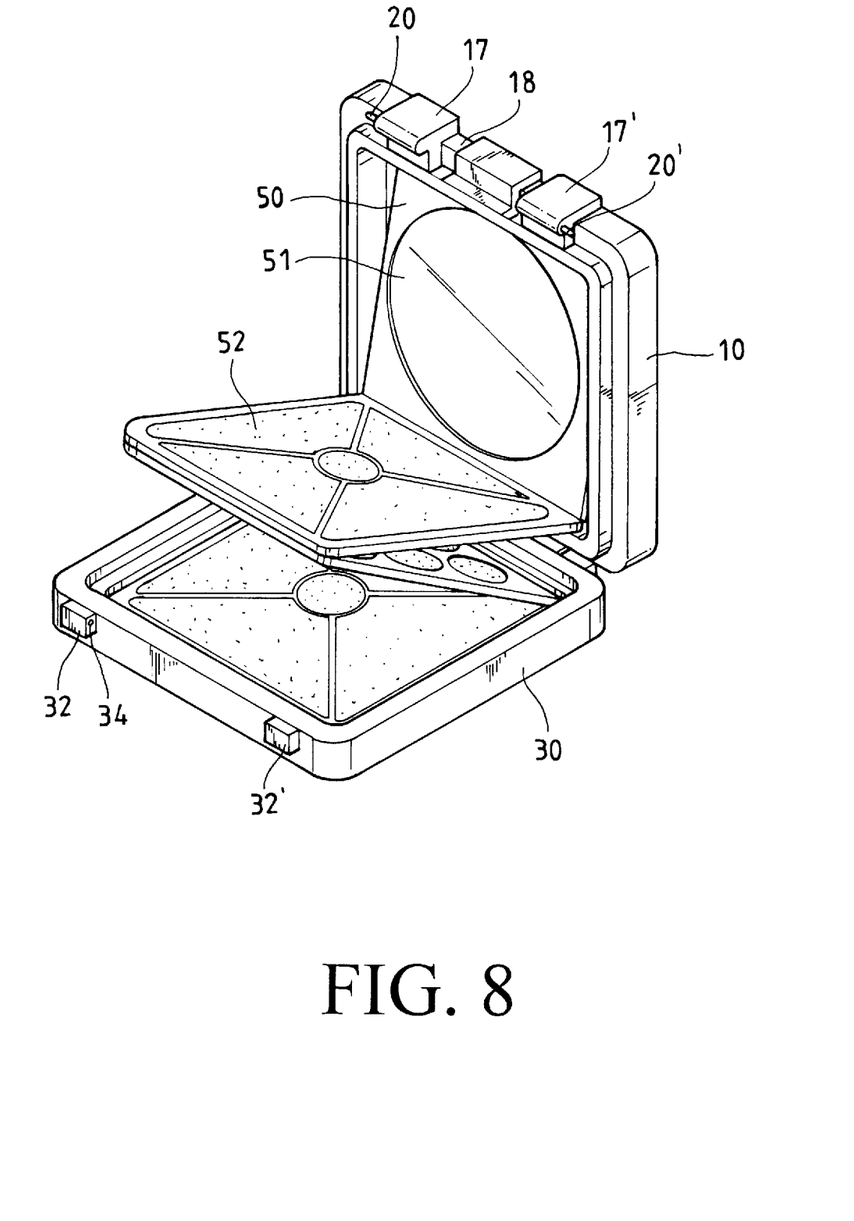
FIG. 8 is an elevational view of the present invention in which the case is adapted for holding cosmetics.
Figure 9:
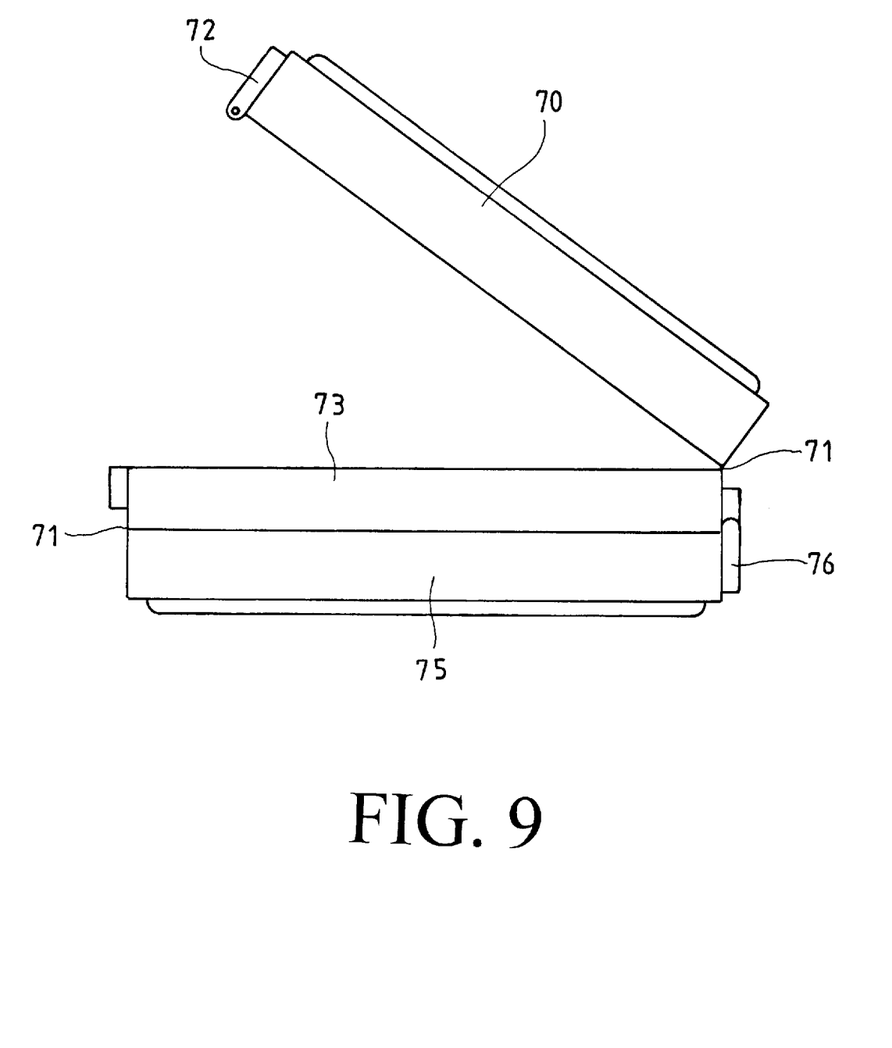
FIG. 9 is an elevational view of another preferred embodiment of the present invention.

Referring to FIGS. 7 and 8, which show an embodiment of the present invention, a plurality of hingedly connected double-sided holding plates 40, 50 are provided in the case for keeping compact disks (41 and 42) or cosmetics such as eyeshadow, blush, powder, etc. (51 and 52) As the case according to the present invention may be openable from either side, its storage space is double that of conventional case structures of the same kind. Furthermore, referring to FIG. 9 which shows another preferred embodiment of the present invention, an intermediate frame 73 is disposed between an upper casing 70 and a lower casing 75. Loose leaf hinge means 71 are respectively disposed between the upper casing 70 and the intermediate frame 73 at one end, with a hinge/latch block 72 disposed at the opposite end of the upper casing 70; and between the lower casing 75 and the intermediate frame 73 at the other end, with a hinge/latch block 76 disposed at the opposite end of the lower casing 75. By means of this arrangement, the case may be openable from the top or the bottom to provide more space for keeping compact disks or cosmetics.

In view of the foregoing, the present invention not only provides more storage space, but it is also convenient to carry.

Although the present invention has been illustrated and described with reference to the preferred embodiment thereof, it should be understood that it is in no way limited to the details of such embodiment but is capable of numerous modifications within the scope of the appended claims.

What is claimed is:

1. A case structure with two openable sides, comprising:
   an upper casing having front and rear sides;
   a lower casing having front and rear sides;
   a series of hingedly connected holding plates which are disposed between the upper casing and the lower casing so as to be containable within the case structure;
   a first pair of hinge/latch blocks connected to the front side of the upper casing, the first pair of hinge/latch blocks being laterally movable between a latched position and an unlatched position; and
   a second pair of hinge/latch blocks connected to the rear side of the upper casing, the second pair of hinge/latch blocks also being laterally movable between the latched position and the unlatched position, the latched position being a position in which the respective pair of hinge/latch blocks engage the lower casing and form a hinge between the upper and lower casings, the unlatched position being a position in which the respective pair of hinge/latch blocks disengage the lower casing and allow the respective side of the upper casing to be opened, whereby the case is openable from both the front side and the rear side by laterally moving the first pair of hinge/latch blocks into the unlatched position with the second pair of hinge/latch blocks in the latched position or moving the second pair of hinge/latch blocks into the unlatched position with the first pair of hinge/latch blocks in the latched position, respectively.

2. A case structure with two openable sides according to claim 1, further comprising:
   a projection disposed on a lateral side of each of the hinge/latch blocks;
   at least one resilient element which engages the projections of a respective pair of hinge/latch blocks such that the hinge/latch blocks are biased towards the latched position; and
   a hinge pin disposed on a lateral side of each of the hinge/latch blocks which engages the lower casing to form the hinge between the upper and lower casings when the respective pair of hinge/latch blocks are in the latched position.

3. A case structure with two openable sides according to claim 1, wherein the series of hingedly connected holding plates includes a first holding plate which is connected to an inner side of the upper casing and a last holding plate which is connected to an inner side of the lower casing; and
   wherein each of the holding plates is double-sided so as to be capable of holding objects on both sides thereof.

4. A case structure with two openable sides according to claim 1, further comprising:
   a peripheral stepped groove at a bottom side of the upper casing;
   a corresponding peripheral stepped groove at a top side of the lower casing;
   a first pair of locking indentations disposed at the front side of the upper casing; and
   a second pair of locking indentations disposed at the rear side of the upper casing;
   wherein the first and second pairs of hinge/latch blocks are received in the first and second pairs of locking indentations, respectively, and each of the hinge/latch blocks includes a retaining block at a rear side thereof which engages an upper side of the peripheral stepped groove at the bottom side of the upper casing.

5. A case structure with two openable sides according to claim 4, further comprising:
   a first pair of projecting blocks disposed at the front side of the lower casing to correspond with the first pair of locking indentations;
   a second pair of projecting blocks disposed at the rear side of the lower casing to correspond with the second pair of locking indentations;
   a pin hole formed in a lateral side of each of the projecting blocks; and
   a hinge pin disposed on a lateral side of each of the hinge/latch blocks, the hinge pins of a respective pair of hinge/latch blocks engaging the pin holes of a respective pair of projecting blocks to form the hinge between the upper and lower casings when the respective pair of hinge/latch blocks are in the latched position.

6. A case structure with two openable sides according to claim 4, further comprising:
   an upper cover of slightly smaller size than the upper casing which is disposed and retained in the peripheral stepped groove of the upper casing; and
   a lower cover of slightly smaller size than the lower casing which is disposed and retained in the corresponding peripheral stepped groove of the lower casing.

* * * * *